(12) United States Patent
Scharf et al.

(10) Patent No.: US 7,787,572 B2
(45) Date of Patent: Aug. 31, 2010

(54) ADVANCED SIGNAL PROCESSORS FOR INTERFERENCE CANCELLATION IN BASEBAND RECEIVERS

(75) Inventors: Louis L. Scharf, Fort Collins, CO (US); Vijay Nagarajan, Boulder, CO (US)

(73) Assignee: Rambus Inc., Los Altos, CA (US)

( * ) Notice: Subject to any disclaimer, the term of this patent is extended or adjusted under 35 U.S.C. 154(b) by 1329 days.

(21) Appl. No.: 11/204,606

(22) Filed: Aug. 15, 2005

(65) Prior Publication Data

US 2006/0227908 A1    Oct. 12, 2006

Related U.S. Application Data

(63) Continuation-in-part of application No. 11/100,935, filed on Apr. 7, 2005, now abandoned, and a continuation-in-part of application No. 11/192,763, filed on Jul. 29, 2005, now Pat. No. 7,463,609.

(51) Int. Cl.
  H04B 1/10   (2006.01)
  H04L 1/00   (2006.01)
  H04L 25/08  (2006.01)

(52) U.S. Cl. ............. 375/346; 455/63.1; 455/67.13

(58) Field of Classification Search .......... 375/346; 455/63.1, 67.13, 501, 14.2, 222, 278.1, 296
  See application file for complete search history.

(56) References Cited

U.S. PATENT DOCUMENTS

| | | |
|---|---|---|
| 3,742,201 A | 6/1973 | Groginsky |
| 4,088,955 A | 5/1978 | Baghdady |
| 4,309,769 A | 1/1982 | Taylor, Jr. |
| 4,359,738 A | 11/1982 | Lewis |
| 4,601,046 A | 7/1986 | Halpern |
| 4,665,401 A | 5/1987 | Garrard et al. |
| 4,670,885 A | 6/1987 | Parl et al. |
| 4,713,794 A | 12/1987 | Byington et al. |
| 4,780,885 A | 10/1988 | Paul et al. |
| 4,856,025 A | 8/1989 | Takai |

(Continued)

FOREIGN PATENT DOCUMENTS

DE    4201439 A1    7/1993

(Continued)

OTHER PUBLICATIONS

Mitra, et al., Adaptive Decorrelating Detectors for CDMA Systems, Accepted for Wireless Communications Journal, Accepted May 1995.

(Continued)

*Primary Examiner*—Chieh M. Fan
*Assistant Examiner*—Freshteh N Aghdam
(74) *Attorney, Agent, or Firm*—Barcelo & Harrison, LLP

(57) ABSTRACT

A multi-mode receiver includes a channel decomposition module (e.g., a Rake receiver) for separating a received signal into multipath components, an interference selector for selecting interfering paths and subchannels, a synthesizer for synthesizing interference signals from selected subchannel symbol estimates, and an interference canceller for cancelling selected interference in the received signal. At least one of the channel decomposition module, the synthesizer, and the interference canceller are configurable for processing multi-mode signals.

68 Claims, 6 Drawing Sheets

U.S. PATENT DOCUMENTS

| | | | |
|---|---|---|---|
| 4,893,316 A | 1/1990 | Janc et al. |
| 4,922,506 A | 5/1990 | McCallister et al. |
| 4,933,639 A | 6/1990 | Barker |
| 4,965,732 A | 10/1990 | Roy, III et al. |
| 5,017,929 A | 5/1991 | Tsuda |
| 5,099,493 A | 3/1992 | Zeger et al. |
| 5,105,435 A | 4/1992 | Stilwell |
| 5,109,390 A | 4/1992 | Gilhousen et al. |
| 5,119,401 A | 6/1992 | Tsujimoto |
| 5,136,296 A | 8/1992 | Roettger et al. |
| 5,151,919 A | 9/1992 | Dent |
| 5,218,359 A | 6/1993 | Minamisono |
| 5,218,619 A | 6/1993 | Dent |
| 5,220,687 A | 6/1993 | Ichikawa et al. |
| 5,224,122 A | 6/1993 | Bruckert |
| 5,237,586 A | 8/1993 | Bottomley |
| 5,263,191 A | 11/1993 | Dickerson |
| 5,280,472 A | 1/1994 | Gilhousen et al. |
| 5,305,349 A | 4/1994 | Dent |
| 5,325,394 A | 6/1994 | Bruckert |
| 5,343,493 A | 8/1994 | Karimullah |
| 5,343,496 A | 8/1994 | Honig et al. |
| 5,347,535 A | 9/1994 | Karasawa et al. |
| 5,353,302 A | 10/1994 | Bi |
| 5,377,183 A | 12/1994 | Dent |
| 5,386,202 A | 1/1995 | Cochran et al. |
| 5,390,207 A | 2/1995 | Fenton et al. |
| 5,394,110 A | 2/1995 | Mizoguchi |
| 5,396,256 A | 3/1995 | Chiba et al. |
| 5,437,055 A | 7/1995 | Wheatley, III |
| 5,440,265 A | 8/1995 | Cochran et al. |
| 5,448,600 A | 9/1995 | Lucas |
| 5,481,570 A | 1/1996 | Winters |
| 5,506,865 A | 4/1996 | Weaver, Jr. |
| 5,513,176 A | 4/1996 | Dean et al. |
| 5,533,011 A | 7/1996 | Dean et al. |
| 5,553,098 A | 9/1996 | Cochran et al. |
| 5,602,833 A | 2/1997 | Zehavi |
| 5,644,592 A | 7/1997 | Divsalar |
| 5,736,964 A | 4/1998 | Ghosh et al. |
| 5,787,130 A | 7/1998 | Kotzin et al. |
| 5,844,521 A | 12/1998 | Stephens et al. |
| 5,859,613 A | 1/1999 | Otto |
| 5,872,540 A | 2/1999 | Casabona |
| 5,872,776 A | 2/1999 | Yang |
| 5,894,500 A | 4/1999 | Bruckert et al. |
| 5,926,761 A | 7/1999 | Reed et al. |
| 5,930,229 A | 7/1999 | Yoshida et al. |
| 5,953,369 A | 9/1999 | Suzuki |
| 5,978,413 A | 11/1999 | Bender |
| 5,995,499 A | 11/1999 | Hottinen et al. |
| 6,002,727 A | 12/1999 | Uesugi |
| 6,014,373 A | 1/2000 | Schilling et al. |
| 6,018,317 A | 1/2000 | Dogan et al. |
| 6,032,056 A | 2/2000 | Reudink |
| 6,088,383 A | 7/2000 | Suzuki et al. |
| 6,101,385 A | 8/2000 | Monte et al. |
| 6,104,712 A | 8/2000 | Robert et al. |
| 6,115,409 A | 9/2000 | Upadhyay et al. |
| 6,127,973 A | 10/2000 | Choi et al. |
| 6,131,013 A | 10/2000 | Bergstrom et al. |
| 6,137,788 A | 10/2000 | Sawahashi et al. |
| 6,141,332 A | 10/2000 | Lavean |
| 6,154,443 A | 11/2000 | Huang et al. |
| 6,157,685 A | 12/2000 | Tanaka et al. |
| 6,157,842 A | 12/2000 | Karlsson et al. |
| 6,157,847 A | 12/2000 | Buehrer et al. |
| 6,163,696 A | 12/2000 | Bi et al. |
| 6,166,690 A | 12/2000 | Lin et al. |
| 6,172,969 B1 | 1/2001 | Kawakami et al. |
| 6,175,587 B1 | 1/2001 | Madhow et al. |
| 6,192,067 B1 | 2/2001 | Toda et al. |
| 6,201,799 B1 | 3/2001 | Huang et al. |
| 6,215,812 B1 | 4/2001 | Young et al. |
| 6,219,376 B1 | 4/2001 | Zhodzishsky et al. |
| 6,222,828 B1 | 4/2001 | Ohlson et al. |
| 6,230,180 B1 | 5/2001 | Mohamed |
| 6,233,229 B1 | 5/2001 | Ranta et al. |
| 6,233,459 B1 | 5/2001 | Sullivan et al. |
| 6,240,124 B1 | 5/2001 | Wiedeman et al. |
| 6,252,535 B1 | 6/2001 | Kober et al. |
| 6,256,336 B1 | 7/2001 | Rademacher et al. |
| 6,259,688 B1 | 7/2001 | Schilling et al. |
| 6,263,208 B1 | 7/2001 | Chang et al. |
| 6,266,529 B1 | 7/2001 | Chheda |
| 6,275,186 B1 | 8/2001 | Kong |
| 6,278,726 B1 | 8/2001 | Mesecher et al. |
| 6,282,231 B1 | 8/2001 | Norman et al. |
| 6,282,233 B1 | 8/2001 | Yoshida |
| 6,285,316 B1 | 9/2001 | Nir et al. |
| 6,285,319 B1 | 9/2001 | Rose |
| 6,285,861 B1 | 9/2001 | Bonaccorso et al. |
| 6,301,289 B1 | 10/2001 | Bejjani et al. |
| 6,304,618 B1 | 10/2001 | Hafeez et al. |
| 6,308,072 B1 | 10/2001 | Labedz et al. |
| 6,310,704 B1 | 10/2001 | Dogan et al. |
| 6,317,453 B1 | 11/2001 | Chang |
| 6,321,090 B1 | 11/2001 | Soliman |
| 6,324,159 B1 | 11/2001 | Mennekens et al. |
| 6,327,471 B1 | 12/2001 | Song |
| 6,330,460 B1 | 12/2001 | Wong et al. |
| 6,333,947 B1 | 12/2001 | van Heeswyk et al. |
| 6,351,235 B1 | 2/2002 | Stilp |
| 6,351,642 B1 | 2/2002 | Corbett et al. |
| 6,359,874 B1 | 3/2002 | Dent |
| 6,362,760 B2 | 3/2002 | Kober et al. |
| 6,363,104 B1 | 3/2002 | Bottomley |
| 6,377,636 B1 | 4/2002 | Paulraj et al. |
| 6,380,879 B2 | 4/2002 | Kober et al. |
| 6,385,264 B1 | 5/2002 | Terasawa |
| 6,396,804 B2 | 5/2002 | Odenwalder |
| 6,404,760 B1 | 6/2002 | Holtzman et al. |
| 6,430,216 B1 | 8/2002 | Kober et al. |
| 6,459,693 B1 | 10/2002 | Park et al. |
| 6,501,788 B1 | 12/2002 | Wang |
| 6,515,980 B1 | 2/2003 | Bottomley |
| 6,570,909 B1 | 5/2003 | Kansakoski |
| 6,574,270 B1 | 6/2003 | Madkour |
| 6,580,771 B2 | 6/2003 | Kenney |
| 6,584,115 B1 | 6/2003 | Suzuki |
| 6,590,888 B1 | 7/2003 | Ohshima |
| 6,680,727 B2 | 1/2004 | Butler |
| 6,798,737 B1 | 9/2004 | Dabak |
| 6,801,565 B1 | 10/2004 | Bottomley |
| 2001/0003443 A1 | 6/2001 | Velazquez et al. |
| 2001/0020912 A1 | 9/2001 | Naruse et al. |
| 2001/0021646 A1 | 9/2001 | Antonucci et al. |
| 2001/0046266 A1 | 11/2001 | Rakib et al. |
| 2002/0001299 A1 | 1/2002 | Petch et al. |
| 2002/0051433 A1 | 5/2002 | Affes et al. |
| 2002/0172173 A1 | 11/2002 | Schilling et al. |
| 2002/0176488 A1 | 11/2002 | Kober et al. |
| 2003/0053526 A1 | 3/2003 | Reznik |

FOREIGN PATENT DOCUMENTS

| | | |
|---|---|---|
| DE | 4326843 A1 | 2/1995 |
| DE | 4343959 A1 | 6/1995 |
| EP | 0558910 A1 | 1/1993 |
| EP | 0610989 A2 | 1/1994 |
| GB | 2280575 A | 2/1995 |
| JP | 2000-13360 A | 1/2000 |

WO  WO 93/12590  6/1995

OTHER PUBLICATIONS

Schneider, Optimum Detection of Code Division Multiplexed Signals, IEEE Transactions on Aerospace and Electronic Systems, Jan. 1979, vol. AES-15 No. 1.

Mitra, et al., Adaptive Receiver Algorithms for Near-Far Resistant CDMA, IEEE Transactions of Communications, Apr. 1995.

Lupas, et al. Near-Far Resistance of Multiuser Detectors in Asynchronous Channels, IEEE Transactions on Communications, Apr. 1990, vol. 38, No. 4.

Lupas, et al., Linear Multiuser Detectors for Synchronous Code-Division Multiple-Access Channels, IEEE Transactions on Information Theory, Jan. 1989; vol. 35, No. 1.

Kohno, et al., Cancellation Techniques of Co-Channel Interference in Asynchronous Spread Spectrum Multiple Access Systems, May 1983, vol. J 56-A. No. 5.

Garg, et al., Wireless and Personal Communications Systems, 1996, pp. 79-151, Prentice Hall, Upper Saddle River, NJ, US.

Cheng, et al., Spread-Spectrum Code Acquisition in the Presence of Doppler Shift and Data Modulation, IEEE Transactions on Communications, Feb. 1990, vol. 38, No. 2.

Behrens et al., Parameter Estimation in the Presence of Low Rank Noise, pp. 341-344, Maple Press, 1988.

Best, Phase-Locked Loops—Design, Simulation, and Applications, pp. 251-287, McGraw-Hill, 1999.

Iltis, Multiuser Detection of Quasisynchronous CDMA Signals Using Linear Decorrelators, IEEE Transactions on Communications, Nov. 1996, vol. 44, No. 11.

Rappaport, Wireless Communications—Principles & Practice, 1996, pp. 518-533, Prentice Hall, Upper Saddle River, NJ, US.

Scharf, et al., Matched Subspace Detectors, IEEE Transactions on Signal Processing, Aug. 1994, vol. 42, No. 8.

Price et al., A Communication Technique for Multipath Channels, Proceedings to the IRE, 1958, vol. 46, The Institute of Radio Engineers, New York, NY, US.

Affes et al., Interference Subspace Rejection: A Framework for Multiuser Detection in Wideband CDMA, IEEE Journal on Selected Areas in Communications, Feb. 2002, vol. 20, No. 2.

Schlegel et al., Coded Asynchronous CDMA and Its Efficient Detection, IEEE Transactions on Information Theory, Nov. 1998, vol. 44, No. 7.

Xie et al., A family of Suboptimum Detectors for Coherent Multiuser Communications, IEEE Journal on Selected Areas in Communications, May 1990, vol. 8, No. 4.

Viterbi, Very Low Rate Convolutional Codes for Maximum Theoretical Performance of Spread Spectrum Multiple-Access Channels, IEEE Journal on Selected Areas in Communications, May 1990, vol. 8, No. 4.

Viterbi, CDMA—Principles of Spread Spectrum Communication, 1995, pp. 11-75 and 179-233, Addison-Wesley, Reading, MA, US.

Verdu, Mimimum Probability of Error for Asynchronous Gaussian Multiple-Access Channels, IEEE Transactions on Information Theory, Jan. 1986, vol. IT-32, No. 1.

Kaplan, Understanding GPS—Principles and Applications, 1996, pp. 83-236, Artech House, Norwood, MA, US.

Scharf, Statistical Signal Processing—Detection, Estimation, and Time Series Analysis, 1990, pp. 23-75 and 103-178, Addison-Wesly, Reading, MA, US.

Stimson, Introduction to Airborne Radar 2nd edition, 1998, pp. 163-176 and 473-491, SciTech Publishing, Mendham, NJ, US.

Behrens et al., Signal Processing Applications of Oblique Projection Operators, IEEE Transactions on Signal Processing, Jun. 1994, vol. 42, No. 6.

Alexander et al., A Linear Receiver for Coded Multiuser CDMA, IEEE Transactions on Communications, May 1997, vol. 45, No. 5.

Schlegel et al., Multiuser Projection Receivers, IEEE Journal on Selected Areas in Communications, Oct. 1996, eol. 14, No. 8.

Halper et al., Digital-to-Analog Conversio n By Pulse-Count Modulation Methods, IEEE Transactions on Instrumentation and Measurement, Aug. 1996, vol. 45, No. 4.

Ortega et al., Analog to Digital and Digital to Analog Conversion Based on Stochastic Logic, IEEE 0-7803-3026-9/95,1995.

Frankel et al., High-performance photonic analogue digital converter, Electronic Letters, Dec. 4, 1997, vol. 33, No. 25.

Lin et al., Digital Filters for High Performance Audio Delta-sigma Analog-to-digital and Digital-to-analog Conversions, Proceedings of ICSP, Crystal Semiconductor Corporation, 1996, Austin, TX, US.

Thomas, Thesis for the Doctor of Philosophy Degree, UMI Dissertation Services, Jun. 1996, Ann Arbor, MI, US.

Schlegel et al., Projection Receiver: A New Efficient Multi-User Detector, IEEE, 1995, 0-7803-2509-5/95.

Behrens, Subspace Signal Processing in Structured Noise, UMI Dissertation Services, Jun. 1990, Ann Arbor, MI, US.

ADVANCED SIGNAL PROCESSORS FOR INTERFERENCE CANCELLATION IN BASEBAND RECEIVERS

CROSS-REFERENCE TO RELATED APPLICATIONS

This application is a continuation-in-part of commonly owned U.S. patent application Ser. No. 11/100,935 (filed Apr. 7, 2005) now abandoned and U.S. patent application Ser. No. 11/192,763 (filed Jul. 29, 2005), now U.S. Pat. No. 7,463,609 which are incorporated by reference herein.

BACKGROUND

1. Field of the Invention

The invention generally relates to the field of signal processing for wireless communications. More specifically the invention is related to interference cancellation in single- and multi-mode communication systems.

2. Discussion of the Related Art

In order to efficiently utilize time and frequency in a communication system, multiple-access schemes are used to specify how multiple users or multiple signals share a specified time and frequency allocation. Spread-spectrum techniques may be used to allow multiple users and/or signals to share the same frequency band and time interval simultaneously. Time division multiple access (TDMA) and frequency division multiple access (FDMA) assign unique time or frequency slots to the user. Code division multiple access (CDMA) assigns a unique code to differentiate each signal and/or user. The codes are typically designed to have minimal cross-correlation to mitigate interference. However, multipath effects introduce cross correlations between codes and cause CDMA systems to be interference-limited.

Multiple-access coding specified by TDMA, FDMA, or CDMA standards provides channelization. In a typical CDMA wireless telephony system, a transmitter may transmit a plurality of signals in the same frequency band by using a combination of scrambling codes and/or spreading (i.e., orthogonalizing) codes. For example, each transmitter may be identified by a unique scrambling code or scrambling-code offset. For the purpose of the exemplary embodiments of the invention, scrambling may denote encoding data with a W-CDMA scrambling code or encoding data with short pseudo-noise (PN) sequences, such as used in CDMA2000 and IS-95 systems.

A single transmitter may transmit a plurality of signals sharing the same scrambling code, but may distinguish between signals with a unique orthogonalizing spreading code. Spreading codes, as used herein, encode the signal and provide channelization of the signal. In W-CDMA, orthogonal variable spreading factor (OVSF) codes are used to spread data for multiple access. CDMA2000 and IS-95 employ Walsh covering codes for multiple-access spreading.

While CDMA signaling has been useful in efficiently utilizing a given time-frequency band, multipath and other channel effects cause these coded signals to interfere with one another. For example, coded signals may interfere due to similarities in codes and consequent correlation. Loss of orthogonality between these signals results in interference, such as co-channel and cross-channel interference. Co-channel interference may include multipath interference from the same transmitter, wherein a transmitted signal propagates along multiple paths that arrive at a receiver at different times. Cross-channel interference may include interference caused by signal paths originating from other transmitters.

Interference degrades communications by causing a receiver to incorrectly detect received transmissions, thus increasing a receiver's error floor. Interference may also have other deleterious effects on communications. For example, interference may diminish capacity of a communication system, decrease the region of coverage, and/or decrease data rates. For these reasons, a reduction in interference can improve reception of selected signals.

Multipath and other forms of interference inherently limit the performance and capacity of other types of transmission protocols. For example, Orthogonal Frequency Division Multiplexing (OFDM) and Time Division Multiplexing (TDM) may be interference-limited both in uplink and downlink communications.

Multi-mode transceivers support more than one transmission protocol. For example, a wireless handset may support CDMA, Global Standard for Mobile Communication (GSM), and an OFDM wireless local area network protocol. Furthermore, a wireless handset may support a variety of implementations of a particular transmission protocol. Since different communication systems may employ different parameters for designing multiple-access channels, the nature of interference between systems can vary greatly. Thus, a multi-mode transceiver may employ a wide variety of interference-mitigation strategies. Alternatively, a multi-mode transceiver may employ a single interference-mitigation technique adapted to each mode.

SUMMARY OF THE INVENTION

Embodiments of the present invention provide for interference cancellation in a multi-mode receiver configured to operate in a variety of communication systems. An interference cancellation system may include a channel decomposition module, a baseband receiver, and an interference canceller. The interference canceller may include one or more signal processing components that are configurable for processing signals from different communication systems. Furthermore, the interference canceller may include one or more signal processors that are not configurable, but rather perform common operations for each of the multi-mode signals.

Although there are many benefits and applications with respect to particular embodiments of the invention, one notable benefit of at least some of the preferred embodiments is a higher received Signal-to-Interference-and-Noise-Ratio (SINR). Embodiments of the invention are applicable to a broad range of receivers in which an actual or virtual decomposition of received signals into Rake-like channels precedes interference cancellation.

In one embodiment of the invention, similar steps are provided for processing signals in any of a variety of wireless transceiver chains. A first step may include obtaining channel estimates that identify and/or model multipath components. For example, time-domain or frequency-domain signals may be used to identify complex gains (including delays) for a plurality of multipath components. A filter having complex coefficients may be provided to synthesize multipath.

An optional step may include extracting transmission-source information (such as source-specific scrambling codes) if transmissions from two or more sources are received. The channel estimates and initial symbol estimates of the transmitted signals may be used to synthesize at least one multipath component from at least one source. A canceller (such as a subtractive canceller or projection operator) may process the synthesized signal to remove one or more interference signals (e.g., multipaths from one or more sources) from one or more predetermined Rake fingers. The projection canceller may provide an optional signal-selection process to produce a linear combination of at least one interference-cancelled signal and at least one uncancelled signal, such as to produce a signal output having an SINR greater than (or at least equal to) the at least one uncancelled signal. Since the projection canceller may be located anywhere within the receiver chain, the synthesis step is configured in accordance with the location of the projection canceller.

Embodiments of the invention may be employed in a multi-mode receiver configured to process multiple transmission protocols (e.g., CDMA, TDMA, OFDM, etc.). Embodiments disclosed herein may be advantageous in multi-mode receivers employing multiple variations, or modes, of CDMA (e.g., cdmaOne, cdma2000, 1xRTT, cdma 1xEV-DO, cdma 1xEV-DV, cdma2000 3x, W-CDMA, Broadband CDMA, Universal Mobile Telephone System (UMTS), and/or GPS). Embodiments disclosed herein may be advantageous to systems employing multiple modes of OFDM (e.g., IEEE 802.11a/g/n, IEEE 802.16, IEEE 802.20, multi-band OFDM, spread-OFDM, MC-CDMA, frequency-hopped OFDM, and DMT). However, the invention is not intended to be limited to such systems.

Receivers and cancellation systems described herein may be employed in subscriber-side devices (e.g., cellular handsets, wireless modems, and consumer premises equipment) and/or server-side devices (e.g., cellular base stations, wireless access points, wireless routers, wireless relays, and repeaters). Chipsets for subscriber-side and/or server-side devices may be configured to perform at least some of the receiver and/or cancellation functionality of the embodiments described herein.

Although particular embodiments are described herein, many variations and permutations of these embodiments fall within the scope and spirit of the invention. Although some benefits and advantages of the preferred embodiments are mentioned, the scope of the invention is not intended to be limited to particular benefits, uses, or objectives. Rather, embodiments of the invention are intended to be broadly applicable to different wireless technologies, system configurations, networks, and transmission protocols, some of which are illustrated by way of example in the figures and in the following description of the preferred embodiments. The detailed description and drawings are merely illustrative of the invention rather than limiting, the scope of the invention being defined by the appended claims and equivalents thereof.

DESCRIPTION OF THE PREFERRED EMBODIMENTS

Figure 1:
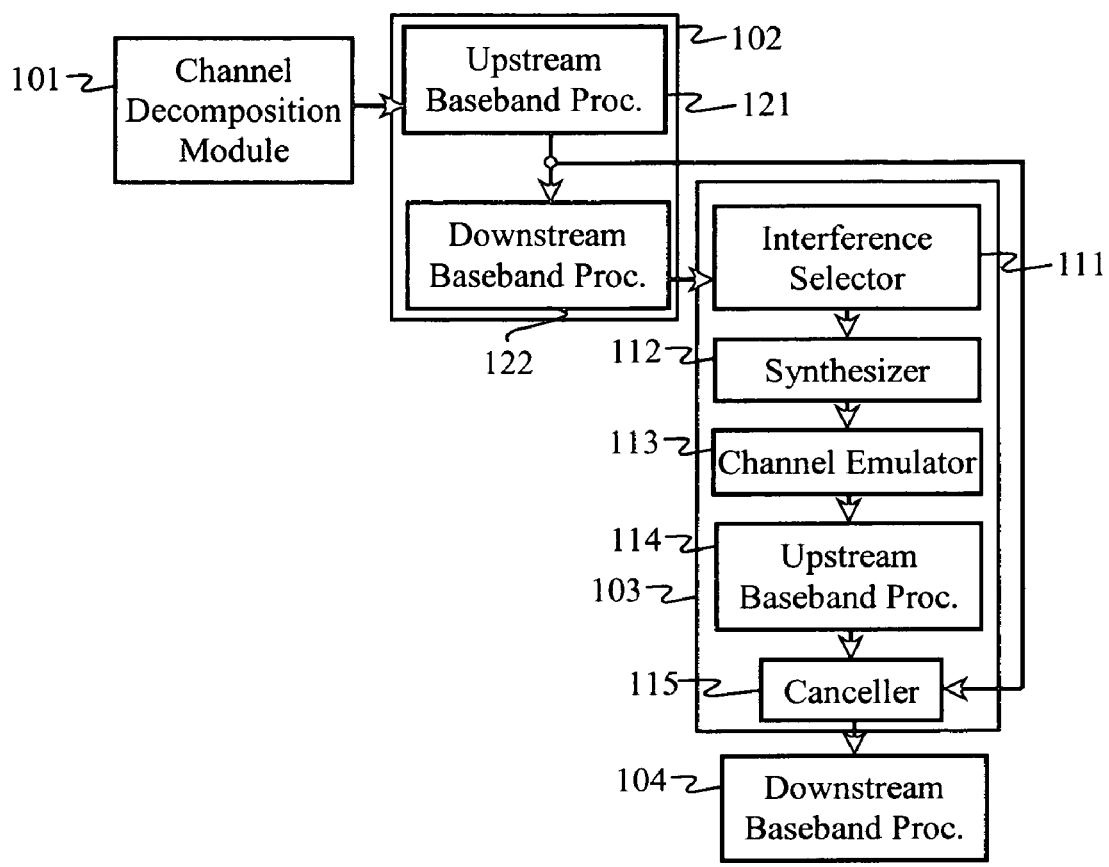
FIG. 1 illustrates an exemplary receiver embodiment of the invention.

While the invention is susceptible to various modifications and alternative forms, specific embodiments thereof are shown by way of example in the drawings and are herein described in detail. It should be understood, however, that the exemplary embodiments are not intended to limit the invention to the particular forms disclosed. Instead, the invention is to cover all modifications, equivalents, and alternatives falling within the spirit and scope of the invention as defined by the claims.

FIG. 1 illustrates one of many possible multi-mode receiver embodiments of the invention that include a channel decomposition module 101, a baseband receiver 102, and an interference canceller 103. The baseband receiver 102 and the interference canceller 103 are configured to process received signals transmitted in accordance with a first transmission protocol (i.e., a first mode).

The baseband receiver 102 may be regarded as comprising an upstream baseband processor 121 and a downstream baseband processor 122. Baseband receiver components preceding (i.e., upstream from) the interference canceller 103 in the receiver chain may be referred to as components of the upstream baseband processor 121. Baseband receiver components following (i.e., downstream from) the interference canceller 103 may be referred to as components of the downstream baseband processor 122.

Embodiments of the invention may provide for some flexibility in denoting which signal-processing modules belong to the upstream baseband processor 121 and which are components of the downstream baseband processor 122. A second downstream baseband processor 104 may optionally be included. Alternatively, the interference canceller 103 output may be coupled back to the downstream baseband processor 122.

An output from the upstream baseband processor 121 may be coupled to the interference canceller 103. Alternatively, the interference canceller 103 may be coupled between the upstream baseband processor 121 and the downstream baseband processor 122. Coupling of the interference canceller 103 to the baseband receiver 102 may denote which signal-processing modules are included in the upstream baseband processor 121, and consequently, which are included in the downstream baseband processor 122. The upstream baseband processor 121 may be configured to perform one or more baseband signal processing operations on a received baseband signal for producing an estimated information signal. The estimated information signal may include a data-symbol estimate, a code-chip estimate, or a sample estimate depending on where the interference canceller 103 is coupled to the baseband receiver 102.

In a multi-mode receiver, the baseband receiver 102 is configurable to process signals transmitted according to a second transmission protocol (i.e., a second mode). Thus, the interference canceller 103 may be similarly configurable for processing received signals according to the second transmission protocol. The baseband receiver 102 and the interference canceller 103 may be configured to process signals corresponding to additional transmission protocols, or modes. Furthermore, the baseband receiver 102 and the interference canceller 103 may be configured to process signals corresponding to multiple variations, or modes, of a transmission protocol.

In an exemplary embodiment of the invention, the baseband receiver 102 may comprise a Rake, an equalizer, and a means to select between the Rake and the equalizer to optimize signal processing. Thus, the term multi-mode may be used to express that at least one alternative signal-processing technique may be employed by a receiver for receiving a signal.

In an exemplary embodiment, the interference canceller 103 may include an interference selector 111, a synthesizer 112, a channel emulator 113, an upstream baseband processor 114, and a cancellation operator 115. The interference selector 111 may be coupled to the receive baseband processor and configured for selecting subchannels that are likely to contribute interference to at least one signal of interest. The interference selector 111 may produce at least one selected interference symbol. The synthesizer 112 is configured to generate a synthesized interference signal from at least one selected interference symbol. The channel emulator 113 is configured to produce an estimated interference signal from the synthesized interference signal.

The upstream baseband processor 114 may be coupled to the channel emulator 113 and configured to produce an estimated received interference signal from the estimated interference signal. Alternatively, the upstream baseband processor 121 may be reused instead of employing a separate processor (i.e, the baseband processor 114). Both the received baseband signal and the estimated interference signal may undergo substantially identical signal-processing operations until they encounter the canceller 115. Thus, the particular signal-processing operations performed by the downstream baseband processor 114 depend on where in the baseband receiver 102 the interference cancellation is placed.

The cancellation operator 115 may comprise a projection operator configured for orthogonally or obliquely projecting a signal in the baseband receiver onto an interference subspace of the estimated received interference. However, other types of cancellation, such as subtractive cancellation, may be performed. Some embodiments of the invention may provide for scale-invariant subtraction.

Following cancellation, the interference-cancelled signal, an uncancelled signal, or a combination of the interference-cancelled and uncancelled signals may be selected for further processing. Any of various signal-quality measures, such as coherence or SINR, may be used in the selection process. The selected signal may be provided with further processing to produce hard-decision or soft-decision estimates of the data. Multiple soft-decision estimates may be combined via any of various combining techniques that are well known in the art, including Maximal Ratio Combining (MRC), Equal Gain Combining (EGC), Minimum Mean Squared Error Combining (MMSEC), Minimum Variance Unbiased Combining (MVUC), and Selection Combining.

Each interference-cancellation system may include an output-signal selection module (not explicitly shown) configured to select between the resulting interference-cancelled signal and the uncanceled signal input to the interference-cancellation system. In some cases, interference cancellation may result in a less-desirable signal (e.g., a signal having a lower SINR) than the original signal input. Thus, it may be advantageous to select the signal having the highest SINR rather than assuming that interference cancellation always yields an improved signal. Alternatively, a linear combination of interference-cancelled and uncancelled signals may be produced.

Various components of the interference canceller 103 may be adaptable for switching between a plurality of transmission protocols. For example, the synthesizer 112 may perform signal-processing operations that are similar to those performed by a transmitter. Thus, the synthesizer 112 may be configured to generate signals in accordance with two or more transmission protocols. Since different receiver baseband processing operations may be performed with respect to different transmission protocols, the upstream baseband processor 114 may be configurable for performing different signal-processing operations in accordance with the transmission protocol of the received signals.

The projection operator 115 may be adaptable to different transmission protocols. The projection operator 115 processes in-phase (I) and quadrature phase (Q) samples, chips, or symbol vectors and/or matrices. However, the bit widths, chip periods, or vector or matrix sizes may vary with respect to the types of transmission protocol employed. Furthermore, any other components of the interference canceller 103 may be configurable to operate with respect to multiple transmission protocols.

The channel emulator 113 may track signals detected by the channel decomposition module 101 that are identified as strong sources and/or strong multipath components. In embodiments comprising Rake fingers, different Rake fingers may work together to receive a predetermined signal of interest. Alternatively, each Rake finger may process its own signal of interest. In one embodiment of the invention, the channel emulator 113 may be configured to impart a delay to a synthesized signal in order to synchronize the synthesized signal with another component of the received baseband signal.

In an exemplary embodiment of the invention, the baseband receiver 102 may comprise a Rake (not shown), an equalizer (not shown), and a means (not shown) for selecting between the Rake and the equalizer to optimize signal processing. Embodiments described herein may be subject to adaptations and permutations that fall within the spirit and scope of the claimed invention. In one embodiment of the invention, interference cancellation may be performed after Rake and/or equalization processing. In an alternative embodiment, interference cancellation may be provided prior to Rake and/or equalizer processing.

In one embodiment, at least one of a received baseband signal, an equalized received baseband signal, and a Rake-processed received baseband signal may be selected for interference cancellation. In another embodiment, at least one of an interference-cancelled signal and an uncancelled signal may be selected for further receiver processing following interference cancellation. In this case, the uncancelled signal may comprise at least one of an equalizer output and a Rake receiver output.

Figure 2:
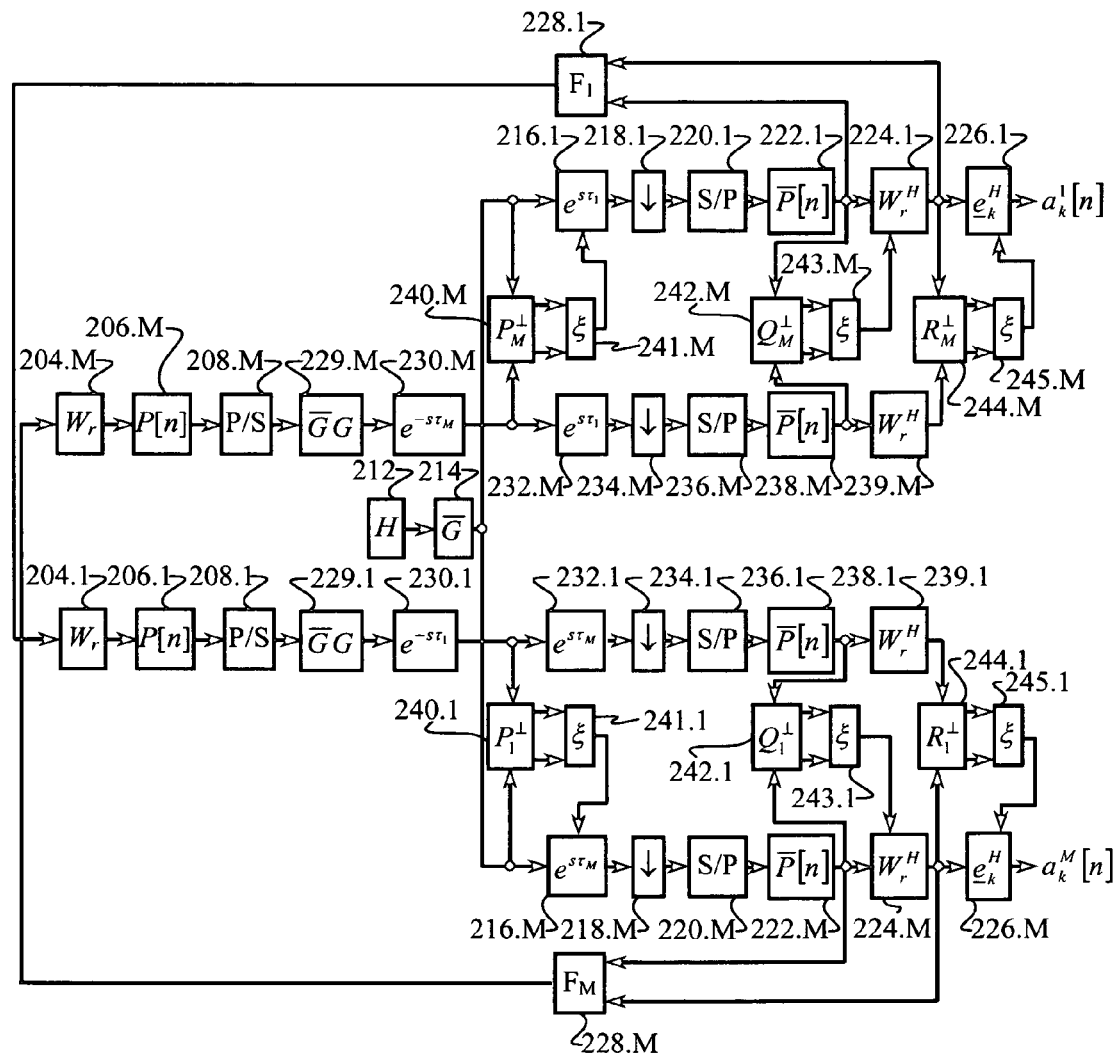
FIG. 2 illustrates an embodiment of the invention configured to cancel interference at any of various points within a CDMA receiver employing a rake receiver.

FIG. 2 illustrates a method embodiment of the invention configured to cancel interference at any of various points within a CDMA receiver. The figure demonstrates baseband processing employed in a CDMA system and is used for illustrative purposes. Those skilled in the art will recognize that other components, such as radio frequency (RF) processing components in the CDMA transceiver may be included.

A CDMA transmitter (not shown) typically formats data, and then performs Walsh coding ($W_r$), scrambling (P[n]), parallel-to-serial conversion (P/S), and pulse-shape filtering (G) prior to coupling into a communication channel represented by a channel operator (H) 212. A received signal coupled from the communication channel 212 is processed by a receiver pulse-shaping filter ($\overline{G}$) 214 and then split into a plurality M of multipath signals from at least one source. A channel decomposition module, such as a Rake receiver that includes M Rake fingers, is configured to decompose the communication channel into a plurality of channel components (i.e., multipath signals). For any $k \in \{1, 2, \ldots, K\}$, where K denotes the number of active subchannels or users, the outputs $a_k^1[n], \ldots, a_k^M[n]$ of the Rake fingers 1 through M at symbol period n are typically combined in order to increase the SNR of at least one signal of interest.

In one exemplary embodiment, each of the M Rake fingers includes a baseband receiver comprising a delay compensator ($e^{s\tau_m}$) 216.1-216.M, a chip-rate sampler ($\downarrow$) 218.1-218.M, a serial-to-parallel converter (S/P) 220.1-220.M, a descrambler ($\overline{P}[n]$) 222.1-222.M, a demultiplexer ($W_r^H$) 224.1-224.M, an optional channel compensator ($\hat{H}$) (not shown), and a traffic Walsh selector ($\underline{e}_k^H$) 226.1-226.M. The baseband receiver may be considered to include the receiver pulse-shaping filter ($\overline{G}$) 214.

During ordinary operation, a Rake finger (e.g., the first Rake finger) typically employs receiver-function blocks 216.1, 218.1, 220.1, 222.1, 224.1, and 226.1 to produce a first Rake-finger output $a_k^1[n]$ for Walsh channel k at symbol period n in Rake finger 1. Outputs from different Rake fingers (e.g., $a_k^1[n], \ldots, a_k^M[n]$) are typically combined in a maximal ratio combiner (not shown), which combines subchannel estimates for each multipath. Other types of optimal combiners may also be used for combining the outputs of the fingers, combining the outputs of multiple receiver antennas, and/or combining the outputs of fingers in multiple receiver antennas.

In an exemplary embodiment of the invention, each demultiplexer 224.1-224.M may comprise a matrix Walsh operator for simultaneously despreading all subchannels, rather than a vector Walsh operator that is typically used for despreading only one user subchannel. Furthermore, embodiments of the invention provide for processing each multipath signal with additional receiver functions configured to perform interference cancellation. For example, each multipath signal may be processed with a plurality of projection operators, such as projection operators 240.1-240.M, 242.1-242.M, and 244.1-244.M located at various points along the Rake finger receive chain.

The baseband receiver may be regarded as comprising an upstream baseband processor and a downstream baseband processor. Baseband receiver components preceding (i.e., upstream from) a particular one of the projection operators 240.1-240.M, 242.1-242.M, and 244.1-244.M in the receiver chain may be referred to as components of the upstream baseband processor. Baseband receiver components following (i.e., downstream from) a particular one of the projection operators 240.1-240.M, 242.1-242.M, and 244.1-244.M in the receiver chain may be referred to as components of the downstream baseband processor.

The projection operators 240.1-240.M, 242.1-242.M, and 244.1-244.M produce an interference-cancelled version of the multipath signal. The interference-cancelled signal or the uncancelled multipath signal may be inserted back into its corresponding Rake finger at the input to the downstream baseband processor. It should be noted that modules 240.1-240.M, 242.1-242.M, and 244.1-244.M may be replaced by subtractive interference cancellation operators. A multipath signal may also be coupled out of its respective Rake finger at any of a plurality of locations within the Rake finger for constructing the projection operators 240.1-240.M, 242.1-242.M, and/or 244.1-244.M.

A plurality of interference selectors 228.1-228.M may be configured to identify and select one or more interfering (e.g., MAI) subchannels in each Rake finger's multipath signal. The output of each interference selector 228.1-228.M may comprise at least one interfering data symbol corresponding to at least one interfering subchannel. In an exemplary embodiment of the invention, interference selectors 228.1-228.M may receive the outputs of the projection operators 224.1-224.M, respectively. The projection-operator outputs are set to zero (or discarded) if they fail to meet a quality criterion, such as coherence and/or SINR. In an alternative embodiment, projection-operator outputs may be combined prior to being compared with a threshold. Thus, the interference selectors 228.1-228.M may be replaced by a single block configured to perform generalized MRC over subchannels and multipaths. In yet another embodiment, a linear combination of cancelled and uncancelled signals may be produced.

In each multipath, the at least one interfering data symbol is re-modulated 204.1-204.M by its original subchannel (e.g., Walsh code), re-scrambled 206.1-206.M, and parallel-to-serial converted 208.1-208.M to produce a simulated transmit version of an interference signal in at least one particular multipath signal. Each synthesized interference signal is match-filtered 229.1-229.M prior to being delayed 230.1-230.M by an amount equal to the channel delay experienced by the interference signal when it arrived at its original Rake finger.

The matched filters 229.1-229.M may comprise any interpolating filter that approximates the combined effects of a transmit filter G and receiver matched-filter $\overline{G}$. An exemplary embodiment may employ a linear interpolator to approximate composite effects of the transmitter, channel path, and receiver. An exemplary embodiment uses a raised-cosine pulse-shaping filter with the standard-specific roll-off factor for the transmit/receive filters. For embodiments that employ an equalizer, the interpolating filter may be expressed by $\overline{G}\hat{H}G$, where $\hat{H}$ denotes the equalizer function. The matched filters 229.1-229.M may be considered part of at least one of a set of signal processing operations, including synthesis, channel emulation, and a second upstream baseband processing operation.

After the delay 230.1-230.M, each interference signal is coupled to a different Rake finger. For example, selected interference signals originating from the first Rake finger are delayed by $\tau_1$ and coupled into the $M^{th}$ Rake finger. Similarly, selected interference signals originating from the $M^{th}$ Rake finger are delayed by $\tau_M$ and coupled into the first Rake finger. The couplings between the first and $M^{th}$ Rake fingers are shown for illustrative purposes only. One skilled in the art will recognize that embodiments of the invention are intended to be configurable with respect to many different coupling schemes between a plurality of Rake fingers. When processing more than two paths, an additional combiner block (not shown) may be provided for combining all interference signals relative to a path of interest. For example, when processing interference signals relative to a first Rake finger, the outputs of the delays 230.2-230.M may be processed (e.g., combined) before coupling into the first Rake finger. A channel emulator may include the delays 232.1-232.M or the combination of delays 230.1-230.M and 232.1-232.M.

One or more selected interference signals for the $M^{th}$ Rake finger may be coupled into projection operator 240.M, 242.M, and/or 244.M. In the case wherein projection operator 240.M is employed, the interference signals are coupled directly into the projection operator 240.M following delay 230.M. A second upstream baseband processor associated with the projection operator 240.M may include matched filter 229.M and/or delay 230.M. The projection operator 240.M may produce an interference-cancelled signal by projecting the first multipath signal onto a subspace that is substantially orthogonal to an interference subspace determined from the $M^{th}$ Rake finger's selected interference signals. An alternative means for cancelling interference from the received baseband signal may be configured to perform any of various interference cancellation techniques, including variations of the projection techniques described herein, as well as other cancellation techniques that are well known in the art.

A decision device 241.M may select either the interference-cancelled signal, the first multipath signal, or a linear combination thereof, by providing a comparison of the signals with respect to one or more signal quality measures. For example, the decision device 241.M may select a signal having the highest coherence or SINR. An output from the decision device 241.M is coupled back into the first finger at approximately the same location that the first multipath signal was diverted out of the first finger.

In the case where the projection operator 242.M is employed, the interference signal is processed by a second upstream baseband processor comprising a delay compensator 232.M, a chip-rate sampler 234.M, a serial-to-parallel converter 236.M, and a descrambler 238.M prior to being coupled into the projection operator 242.M. Similarly, the first multipath signal is processed by the delay compensator 216.1, the chip-rate sampler 218.1, the serial-to-parallel converter 220.1, and the descrambler 222.1 prior to being diverted from the first Rake finger into the projection operator 242.M. The projection operator 242.M produces an interference-cancelled signal by projecting the processed first multipath signal onto a subspace that is substantially orthogonal to an interference subspace determined from the $M^{th}$ Rake finger's selected interference signals. A decision device 243.M selects between the processed first multipath signal and the interference-cancelled signal produced by the projection operator 242.M. Alternatively, the decision device 243.M may produce a linear combination of an uncancelled signal and an interference-cancelled signal. The decision device 243.M couples its selection back into the first Rake finger at the demultiplexer 224.1.

In the case wherein the projection operator 244.M is employed, the interference signal is processed by a second upstream baseband processor comprising delay compensator 232.M, chip-rate sampler 234.M, serial-to-parallel converter 236.M, descrambler 238.M, and a demultiplexer 239.M prior to being coupled into the projection operator 244.M. Similarly, the first multipath signal is processed by the demultiplexer 224.1 prior to being diverted from the first Rake finger into the projection operator 244.M. The projection operator 244.M produces an interference-cancelled signal by projecting the processed first multipath signal onto a subspace that is substantially orthogonal to an interference subspace determined from the $M^{th}$ Rake finger's selected interference signals.

In order to effectively cancel ISI and other interference, the projection operator 244.M may be configured to cancel interference from a sequence of symbol vectors, rather than just an instantaneous symbol vector. A decision device 245.M selects between the processed first multipath signal, the interference-cancelled signal produced by the projection operator 244.M, or a linear combination of the two. The decision device 245.M couples its selection back into the first Rake finger at the traffic Walsh channel selector 226.1. Channel compensation (not shown) may be provided prior to combining (not shown) with like Walsh channels from other finger outputs.

Although FIG. 2 illustrates transceiver-chain functionality with respect to a single source (e.g., a base station), the invention may be adapted to systems having multiple sources. Furthermore, since many receiver operations are commutative, the order of receiver operations may include alternative configurations. Selectors 226.1-226.M may be replaced by MRC combiners of raw signals (i.e., received baseband signals) and projection-cancelled signals. Various components shown herein may be consolidated into a single component. Similarly, certain components may be added and/or removed according to particular transceiver designs and communication protocols without departing from the spirit and scope of the invention.

Exemplary embodiments of the invention may be configured to process time-division multiplexed signals, such as in a CDMA EV-DO system. For example, the data-formatting block 202 and the Walsh coder 204 may be configured to process multiple data streams. The symbol vector is time multiplexed prior to scrambling 206. EV-DO transmissions typically comprise a pilot, a MAC, and at least one traffic symbol sequence. The pilot is assigned Walsh Code 0, the preamble consists of bi-orthogonally modulated data, the MAC comprises symbols on a set of Walsh codes of length 64, and the traffic comprises symbols on all 16-length Walsh codes. Therefore, each projection operator 244.*m* and decision device 245.*m* may be configured to separately process each EV-DO channel (including traffic, MAC, and pilot channels) to provide separate projection and selection operations for sample-, chip-, or symbol-level cancellation.

Figure 3A:
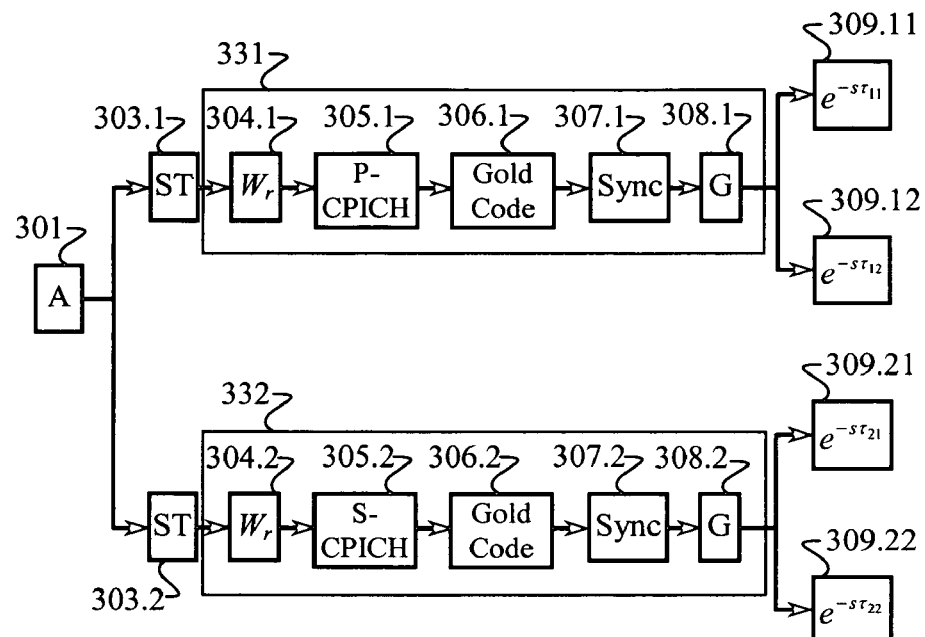
FIG. 3A shows a transmitter part of a W-CDMA system employing open-loop transmit-diversity.

FIG. 3A shows a transmitter part of a W-CDMA system employing open-loop transmit-diversity (OLTD). An exemplary embodiment of the invention is configured to operate in a W-CDMA system that uses Alamouti space-time coding with two transmit antennas to increase network capacity. However, embodiments described herein may be configured to operate in other types of multi-antenna systems designed for transmit and/or receive diversity.

A data source 301 provides multiple data symbols to primary and secondary transmit-diversity systems 331 and 332. Since the Alamouti scheme employs a 2×2 matrix coding technique, each of a pair of space-time (ST) encoders 303.1 and 303.2 is provided a pair of data symbols. Both space-time encoders 303.1 and 303.2 are typically provided with identical pairs of data symbols. Space-time coded symbols are coupled into Walsh encoders 304.1 and 304.2, which process all active user and common channels except pilot and control channels to produce a plurality of Walsh channels. Pilot-signal modules 305.1 and 305.2 provide the Walsh channels with P-CPICH and S-CPICH pilot channels, respectively. Gold-code scramblers 306.1 and 306.2 scramble the Walsh and pilot channels. Synchronizers 307.1 and 307.2 time-multiplex a synchronization channel (SCH) and a scrambled primary common control physical channel (P-CCPCH). The resulting time-multiplexed signal is added to signal outputs from the Gold-code scramblers 306.1 and 306.2, which are transmitted into a communication channel after processing by pulse shaping filters 308.1 and 308.2 and RF front-end processors (not shown).

An exemplary channel model is illustrated wherein a primary transmit channel includes two multipath delays 309.11 and 309.12 and associated gains 339.11 and 339.12 having values $h_{11}$ and $h_{12}$, respectively. Similarly, a diversity channel includes two multipath delays 309.21 and 309.22 with associated gains 339.21 and 339.22 having values $h_{21}$/and $h_{22}$, respectively.

Figure 3B:
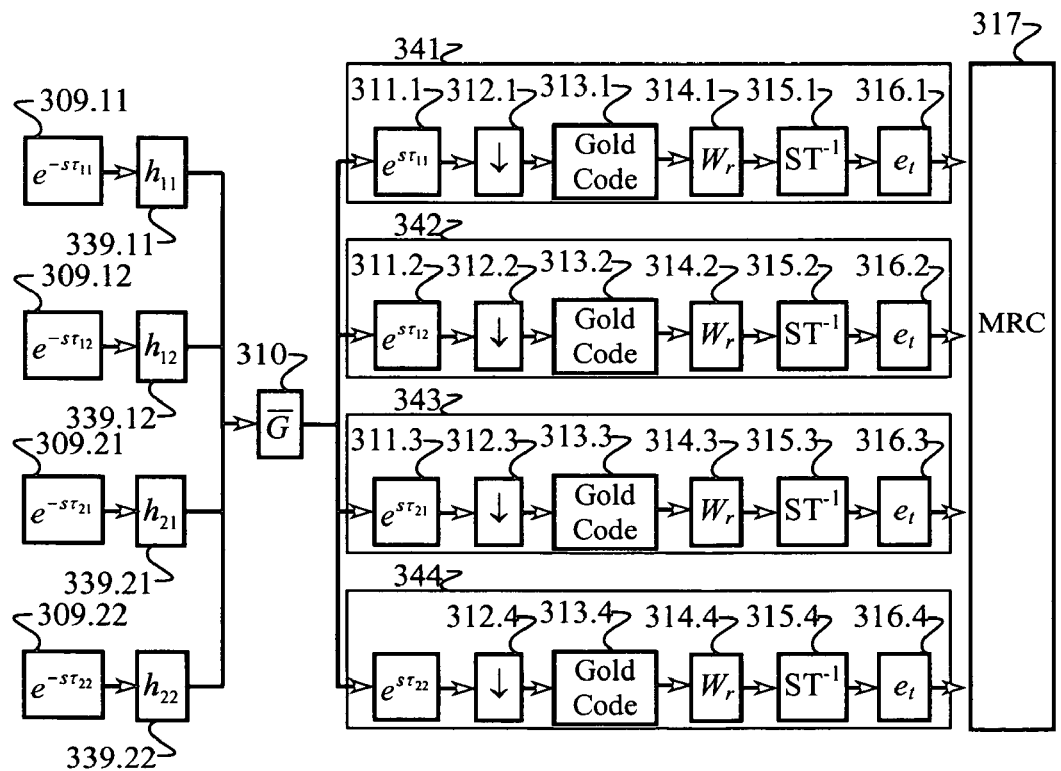
FIG. 3B shows an alternative receiver embodiment according to one aspect of the invention.

A receiver shown in FIG. 3B is configured to receive a signal according to the exemplary channel model. After RF processing (not shown), the resulting baseband signal is processed by a receiver filter 310 matched to the transmit filters 308.1 and 308.2. Each multipath component/diversity path may be processed in an associated Rake finger 341-344. Each finger 341-344 may include a delay compensator 311.1-311.4, a chip-rate sampler 312.1-312.4, a de-scrambler 313.1-313.4, a Walsh-Hadamard despreader (such as a fast Walsh transform) 314.1-314.4, an optional space-time decoder 315.1-315.4 (for processing diversity paths in the case wherein Alamouti space-time codes are employed), and a Walsh traffic-channel selector 316.1-316.4. The output from each finger 341-344 may be provided with channel compensation before being processed by an optimal combiner 317. The combiner 317 may be configured to perform any of various well-known combining techniques, including MRC, EGC, SC, and MMSEC.

Figure 3C:
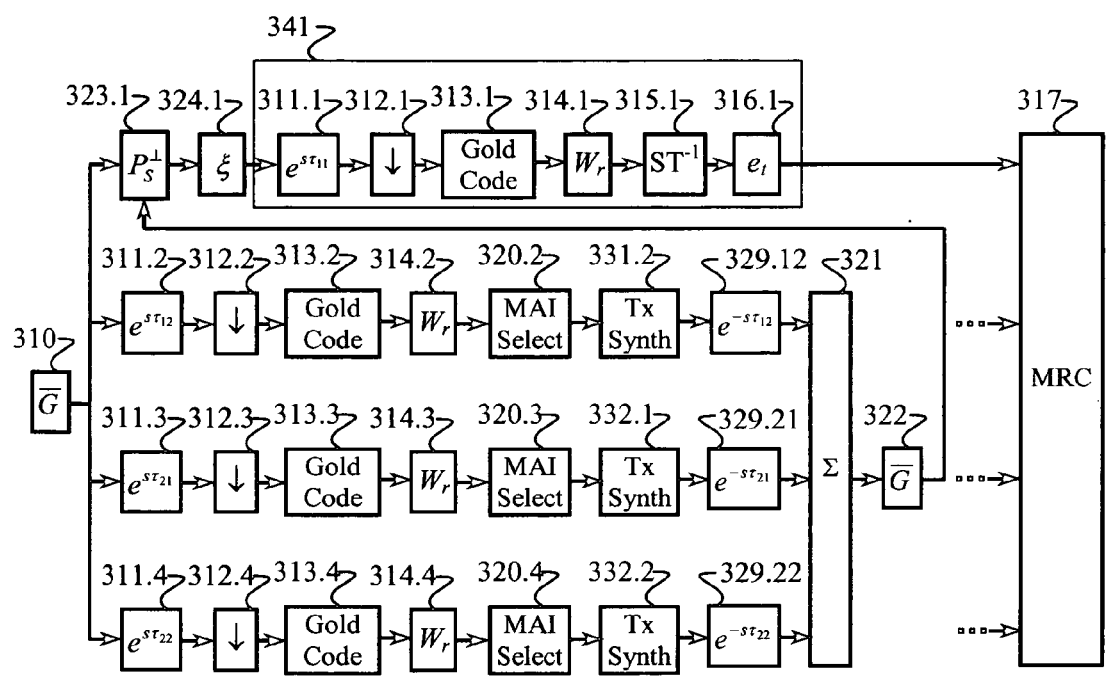
FIG. 3C illustrates a multi-mode receiver equipped to cancel interference in a signal received by a Rake finger.

FIG. 3C illustrates a receiver equipped to cancel interference in a signal received by a first Rake finger 341. A received baseband signal may be processed by a receiver matched filter 310 before undergoing channel decomposition, which separates the received baseband signal into multipath components that are processed by a plurality of Rake fingers. In this exemplary embodiment, an interference-cancellation module 323.1 (such as a projection canceller) is employed by the first finger 341. In alternative embodiments, interference cancellation may be performed for each of the plurality of Rake fingers.

A baseband receiver may include delay compensators 311.2-311.4, chip-rate samplers 312.2-312.4, descramblers 313.2-313.4, and FWTs 314.2-314.4. The baseband receiver also comprises components 311.1, 312.1, 313.1, 314.1, 315.1, and 316.1 of the first finger 341. The received baseband signal is coupled into the interference-cancellation module 323.1 that is upstream to Rake finger 341 processing. In this case, the receiver matched filter 310 may be regarded as an upstream baseband processor, whereas the first finger 341 may be regarded a downstream baseband processor.

Signal outputs from the Walsh-Hadamard transforms 314.2-314.4 are coupled into a plurality of interference-selection blocks (e.g., MAI-selection blocks 320.2-320.4) configured to identify and select subchannels that are likely to contribute multiple-access interference to at least one signal of interest. In this particular embodiment, space-time decoding is not performed prior to interference synthesis. The outputs of the interference-selection blocks 320.2-320.4 are used by synthesizers 331.2, 332.1, and 332.2 to synthesize transmitted interference signals. Synthesizer 331.2 is functionally similar to the primary transmit-diversity system 331, and synthesizers 332.1 and 332.2 are functionally similar to the secondary transmit-diversity system 332.

Signal outputs from the synthesizers 331.2, 332.1, and 332.2 are processed by channel emulators 329.12, 329.21, and 329.22, respectively, which compensate for delay induced by the multipath channel to produce estimated interference signals. A combiner 321 produces a linear combination of the estimated interference signals. A second upstream baseband processor includes a receiver filter 322 matched to transmit filter 308.1 and/or 308.2. The estimated interference signal is filtered by filter 322 before being coupled to the interference-cancellation module 323.1 along with the received baseband signal output from filter 310. The filters 322 and 310 resemble each other such that upstream baseband processing operations performed on the estimated interference signal and the received baseband signal are substantially identical. The output of decision module 324.1 is coupled to the Rake finger 341 (which comprises components 311.1, 312.1, 313.1, 314.1, 315.1, and 316.1). The combiner 317 may receive inputs from one or more Rake fingers, such as finger 341.

In some embodiments of the invention, functional blocks may be combined. Other variations and permutations may be implemented without departing from the intended scope and spirit of the invention. Alternative embodiments may consolidate multiple transmit or receive elements into a single element. In some embodiments, interfering subchannels may be selected using optimally combined data. In such cases, space-time encoders may be included in the loop. Furthermore, channel gain compensation and emulation may be provided in the synthesis loop.

A preferred embodiment of the invention may be configurable for a plurality of different communication formats employed in a multi-mode transceiver. For example, receiver and synthesizer components in an interference-cancellation system may adapt their signal processing operations depending on the type of transmission protocol employed. FIG. 3C illustrates a case in which W-CDMA is employed. However, appropriate signal-processing modifications to some of the receiver components (e.g., 313.1-313.4, 314.1-314.4, and 331.2-331.4) may be made to adapt the signal processing to alternative transmission protocols.

Figure 4:
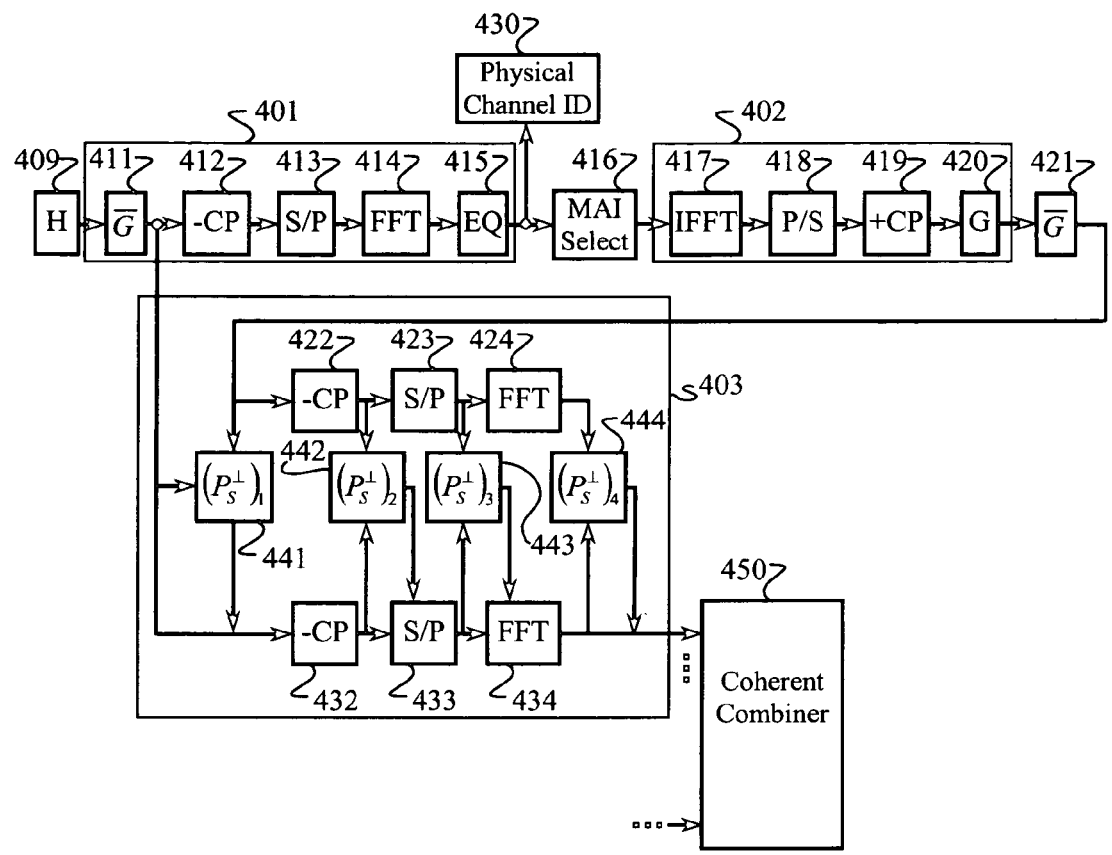
FIG. 4 illustrates a multi-mode receiver embodiment of the present invention configured for processing Orthogonal Frequency Division Multiplexing signals or other signals having a cyclic prefix.

FIG. 4 illustrates how an embodiment of the present invention may be configured for a receiver in a system employing guard bands and cyclic prefixes, such as systems conforming to IEEE 802.16, 802.11b, and 802.11g standards. The receiver shown in FIG. 4 is configured to receive a transmission from a communication channel 409 and process a received baseband signal with a baseband OFDM receiver. An upstream baseband processor includes a receiver pulse-shaping filter 411 matched to a transmitter pulse-shaping filter (not shown). A downstream baseband processor includes a cyclic-prefix remover 412 for discarding a predetermined signal interval in each received symbol to mitigate ISI, a serial-to-parallel converter (S/P) 413, a Fast Fourier Transform (FFT) 414, and an optional subchannel equalizer (EQ) 415.

An interference selector 416 may employ statistical signal processing techniques to identify active subchannels and discard data symbol estimates corresponding to poor subcarrier-channel conditions. In a preferred embodiment of the invention, the interference selector 416 may compare soft-decision symbol estimates for each subchannel to a set of thresholds including a lower threshold and an upper threshold. Symbols that do not fall within the two thresholds may be discarded to ensure that subchannels of interest are relatively free of the effects of fading and interference. In one embodiment, the thresholds may be determined via measured channel conditions and/or pilot-signal strength. In another embodiment, subchannels may be selected until a quality measure for interference cancellation is met.

A physical channel estimator, such as a physical channel identification module 430, may be configured to process outputs from the OFDM receiver apparatus 401 for providing an equivalent multipath profile. For example, the physical channel identification module 430 may process received preamble symbols or other received signals having known characteristics for determining the complex frequency response of the channel and/or an equivalent multipath profile.

Selected data symbols (and their associated subchannel information) are passed to a synthesizer 402 configured to synthesize one or more selected interference signals. The synthesizer 402 essentially mimics a baseband transmitter. However, the synthesizer 402 may employ a channel emulator (not shown) that uses the multipath profile produced by the physical channel identification module 430 to emulate channel 409 distortions in the synthesized interference. An inverse FFT (IFFT) 417 and a parallel-to-serial converter (P/S) 418 produce a digital sequence corresponding to selected data symbols mapped onto predetermined frequency subchannels (i.e., subcarriers). A cyclic prefix may be added 419 to the digital sequence, which is then processed by a transmitter pulse-shaping filter 420. A second upstream baseband processor includes a receiver pulse-shaping filter 421 for processing the synthesized interference. Alternatively, a single interpolating filter (not shown) may be employed instead of separate filters 420 and 421.

In one exemplary embodiment of the invention, an interference signal synthesized by the synthesizer 402 and the received baseband signal are coupled to a plurality of receiver blocks (such as receiver block 403) wherein each receiver block is associated with a particular multipath delay. For example, M receiver blocks may be used for M identified strong multipath components. Each received baseband signal that is coupled into receiver block 403 is first sampled according to symbol boundaries corresponding to a particular multipath component identified by the physical channel identification module 430.

For each identified multipath component, one or more interfering subchannels may be removed from a signal of interest. A resulting interference-cancelled signal is demodulated, and demodulated signals from the plurality of receiver blocks may be combined in a coherent combiner 450. The combiner 450 may employ preamble symbol strengths on the subcarriers in each finger as a combining criterion.

One or more interference-cancellation modules (such as projection modules 441-444) are provided for cancelling interference in the received baseband signal. In a first exemplary embodiment, the estimated interference and the received baseband signal are processed by projection module 441. The projection module 441 may optionally provide channel emulation to the estimated interference prior to interference cancellation.

According to one embodiment of the invention, the received baseband signal may be sampled with respect to a multipath delay selected by the physical channel identification module 430. Similarly, the interference signal may be provided with channel emulation and sampled with the same delay as the received baseband signal. The received baseband signal and the interference signal are then coupled to the projection module 441, which projects the interference substantially out of the received baseband signal. The projection module 441 may select as its output the resulting interference-cancelled signal, the received baseband signal, or a linear combination of the two. The selected output signal is processed by a cyclic-prefix remover 432, an S/P module 433, and an FFT 434 before being combined with other signals (e.g., interference-cancelled signals and/or received baseband signals) in the combiner 450. The cyclic-prefix remover 432, S/P module 433, FFT 434, and combiner 450 may be regarded as downstream baseband processing components.

In an alternative embodiment, the upstream baseband processor and the second upstream baseband processor include cyclic-prefix removers 432 and 422, respectively. Following cyclic prefix removal, the estimated interference and the received baseband signal are coupled to projection module 442. The projection module 442 may optionally provide the estimated interference signal with channel emulation prior to interference cancellation. The S/P module 433 and the FFT 434 process the projection module's 442 output (which may comprise either or both the received baseband signal with its cyclic prefix removed and an interference-cancelled signal produced by the projection module 442) prior to combining 450. The S/P module 433, the FFT 434, and the combiner 450 may be regarded as downstream baseband processing components.

In another embodiment, the upstream baseband processor comprises the cyclic-prefix remover 432 and the S/P module 433, and the second upstream baseband processor comprises the cyclic-prefix remover 422 and the S/P module 423. The FFT 434, and the combiner 450 may be regarded as downstream baseband processing components. The projection module 443 may optionally provide the interference signal with channel emulation prior to interference cancellation. The projection module's 443 output is then processed by the FFT 434 prior to combining 450.

In yet another embodiment of the invention, an upstream baseband processor comprising the cyclic-prefix remover 432, the S/P module 433, and the FFT 434 prior to interference cancellation 444 may process the received baseband signal. A baseband receiver comprising the cyclic-prefix remover 422, the S/P module 423, and the FFT 424 may process the estimated interference.

In one embodiment, the output of the interference selector 416 may optionally be coupled directly to the projection module 444 instead of being processed by the synthesizer 402 and receiver components 422-424. Such processing may be performed, for example, when the multipath delay is some integer multiple of the chip period over-sampling factor multiplied by the inverse of the sampling rate, or equivalently, an integer multiple of the data-symbol duration divided by the FFT length. Thus, signal-processing parameters (such as the sampling rate and the FFT length) may be adapted in response to measured multipath profiles in order to simplify the receiver system and/or improve receiver performance.

Similar simplifications may be used to eliminate components shown herein when cancellation is performed downstream in the receiver chain. The output of the projection module 444 may be sent directly to the combiner 450. The output of the combiner 450 is typically followed by additional baseband processing modules (not shown), including de-interleaving, despreading, descrambling, and channel decoding.

In an exemplary embodiment of the invention, interference estimates from a first multipath signal may be used to cancel interference in a received baseband signal processed with respect to a second multipath signal. For example, a projection operator configured to project out interference in a first multipath component of a received baseband signal may use interference estimates determined from one or more multipath components other than the first component.

Embodiments of the invention may be useful for reducing the cyclic prefix or guard interval used in multicarrier systems. Some embodiments may be used for mitigating inter-channel interference due to Doppler shifts in Doppler-spread channels. Receiver embodiments may also find utility in exploiting transmitted energy in the cyclic prefix of a conventional multicarrier signal. While symbol-level cancellation is well known for mitigating ISI in an OFDM system, some embodiments of the present invention provide for chip- or sample-level cancellation. The term "sample level" denotes that multiple time-domain samples per chip are processed in a canceller.

Figure 5:
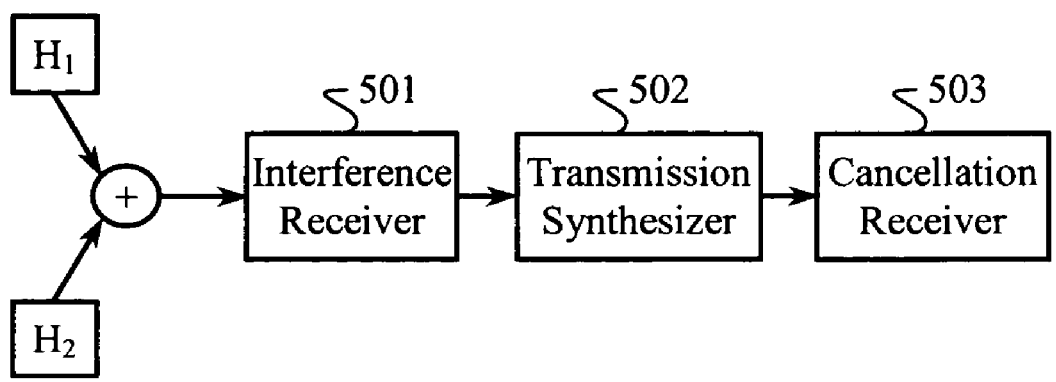
FIG. 5 shows an embodiment of a multi-mode receiver configured to cancel interference in a Global Standard for Mobile Communication system using Time Division Multiplexing.

FIG. 5 shows an embodiment of the invention adapted to cancel interference in a receiver configured to process signals in a GSM system. In GSM, co-channel interference arises when adjacent base stations use the same frequency subchannel to transmit to subscribers. In an exemplary embodiment, transmitted data symbols $a_1$ and $a_2$ intended for different users are transmitted in the same subchannel by adjacent base stations. The transmissions corresponding to $a_1$ and $a_2$ undergo different channel effects, which are represented by channel blocks $H_1$ and $H_2$, respectively.

Signals received by an interference receiver 501 are downconverted into received baseband signals. The interference receiver 501 is configured to select one or more interference signals that may interfere with at least one signal of interest. In this case, symbol $a_1$ is a symbol of interest and symbol $a_2$ is an interfering symbol. The interference receiver 501 demodulates the selected interference symbol $H_2 a_2$, which is coupled to a transmission synthesizer 502.

The interference receiver 501 may be configured to determine channel information from known training sequences in the transmission. For example, mid-ambles (which are typically used in GSM transmissions) may be correlated with training sequence codes (TSC) to obtain channel information. A GSM user may be assigned one of eight possible TSCs.

In one embodiment of the invention, the interference receiver 501 may comprise an advanced receiver capable of suppressing multipath interference. The receivers 501 and/or 503 may optionally exploit spectral inefficiencies of transmissions employing real constellations (e.g., GMSK, PAM, BPSK) by combining the real and imaginary channels, each of which is modulated with the same real symbol. Methods and architectures for providing first-order estimates of the signal are well known in the art and may be used for interference detection as well. For example, one may use equalizers and pre-whitening filters for accurate first-order estimates. However, the complexity of such filters may be reduced if only a coarse first-order estimate is required.

The transmission synthesizer 502 GMSK modulates and pulse shapes the selected interference. The transmission synthesizer 502 may optionally include a channel emulator (not shown). Synthesized signals produced by the transmission synthesizer 502, as well as the received baseband signal, are coupled into a cancellation receiver 503. The cancellation receiver 503 may be configured to orthogonally or obliquely project the received baseband signal onto a subspace corresponding to the selected interference. Either an interference-cancelled signal produced by the cancellation receiver 503 or the uncancelled signal (i.e., the received baseband signal) may be selected based on measured SINR or some other signal-quality parameter. Alternatively, the cancellation receiver 503 may output a linear combination of the interference-cancelled signal and the uncancelled signal. The projection canceller may be replaced by a subtractive canceller.

The method and system embodiments described herein merely illustrate particular embodiments of the invention. It should be appreciated that those skilled in the art will be able to devise various arrangements, which, although not explicitly described or shown herein, embody the principles of the invention and are included within its spirit and scope. Furthermore, all examples and conditional language recited herein are intended to be only for pedagogical purposes to aid the reader in understanding the principles of the invention. This disclosure and its associated references are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated by those skilled in the art that the block diagrams herein represent conceptual views of illustrative circuitry, algorithms, and functional steps embodying principles of the invention. Similarly, it should be appreciated that any flow charts, flow diagrams, system diagrams, and the like represent various processes which may be substantially represented in computer-readable medium and so executed by a computer or processor, whether or not such computer or processor is explicitly shown.

The functions of the various elements shown in the drawings, including functional blocks labeled as "processors" or "systems," may be provided through the use of dedicated hardware as well as hardware capable of executing software in association with appropriate software. When provided by a processor, the functions may be provided by a single dedicated processor, by a shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, through the interaction of program control and dedicated logic, or even manually, the particular technique being selectable by the implementer as more specifically understood from the context.

Any element expressed herein as a means for performing a specified function is intended to encompass any way of performing that function including, for example, a combination of circuit elements which performs that function or software in any form, including, therefore, firmware, micro-code or the like, combined with appropriate circuitry for executing that software to perform the function. Embodiments of the invention as described herein reside in the fact that the functionalities provided by the various recited means are combined and brought together in the manner which the operational descriptions call for. Applicant regards any means which can provide those functionalities as equivalent as those shown herein.

The invention claimed is:

1. A multi-mode receiver, comprising:
a channel decomposition module configured for performing a decomposition of a communication channel into a plurality of subchannels;
a baseband receiver comprising an upstream baseband processor and a downstream baseband processor; and
an interference canceller coupled between the upstream baseband processor and the downstream baseband processor;
wherein at least one of the channel decomposition module, the baseband receiver, and the interference cancellation system is configurable for processing multi-mode signals;
an interference selector coupled to the downstream baseband processor and configured for selecting subchannels that are likely to contribute interference to at least one signal of interest, for producing at least one selected interference symbol;
a synthesizer configured to synthesize a synthesized interference signal from the at least one selected interference symbol;
a channel emulator configured to produce an estimated interference signal from the synthesized interference signal;

a second upstream baseband processor coupled to the channel emulator and configured for producing an estimated received interference signal from the estimated interference signal; and a canceller configured for orthogonally or obliquely projecting a signal output from the baseband receiver onto a subspace that is orthogonal or oblique to a subspace of the estimated received interference signal.

2. The receiver recited in claim 1, wherein the synthesizer is configured for producing a linear combination of synthesized interference signals.

3. The receiver recited in claim 1, wherein the interference selector is configured to recursively determine subsets of channels that may be used in subtractions or in projections of increasing dimension.

4. The receiver recited in claim 1, wherein the interference canceller comprises a subtractive canceller.

5. The receiver recited in claim 1, wherein the baseband receiver further comprises a receiver filter matched to a transmit filter.

6. The receiver recited in claim 1, wherein the channel decomposition module includes a physical channel identification module configured to estimate a multipath profile.

7. The receiver recited in claim 1, wherein the multi-mode signals include at least one of a set of signals, including signals corresponding to multiple transmission protocols, signals corresponding to multiple variations of a particular transmission protocol, and signals corresponding to multiple receiver signal-processing techniques.

8. The receiver recited in claim 1, wherein the interference canceller is configured to process a sequence of estimated symbols.

9. The receiver recited in claim 1, wherein at least one of the synthesizer, the channel emulator, and the second upstream baseband processor is configured to synchronize the estimated received interference signal with the signal output from the baseband receiver.

10. The receiver recited in claim 1, wherein the channel decomposition module is configured to track signals that are identified as at least one of strong sources and strong multi path components.

11. The receiver recited in claim 1, wherein the baseband receiver comprises a Rake receiver and an equalizer, the baseband receiver being configured for selecting at least one of the Rake receiver and the equalizer for processing a received baseband signal.

12. The receiver recited in claim 1 configured to operate in at least one of a transmit diversity system and a receive-diversity system.

13. The receiver recited in claim 1, wherein the interference canceller includes an interference-cancelled signal combiner.

14. The receiver recited in claim 13, wherein the interference-cancelled signal combiner is configured to combine the outputs over a plurality of subchannels and multi paths.

15. The receiver recited in claim 13, wherein the interference-cancelled signal combiner is configured to perform at least one of Maximal Ratio Combining, Equal Gain Combining, Minimum Mean Squared Error Combining, Minimum Variance Unbiased Combining, and Selection Combining.

16. The receiver recited in claim 1, configured to operate in at least one of a base station and a handset.

17. The receiver recited in claim 1 integrated in a chipset.

18. The receiver recited in claim 1, wherein at least one of the channel decomposition module, the baseband receiver, and the interference cancellation system is configurable for processing a plurality of signal types of a set of signals, the set including GSM signals, CDMA signals, W-CDMA signals, and OFDM signals.

19. The receiver recited in claim 1, wherein at least one of the channel decomposition module, the baseband receiver, and the interference cancellation system is configurable for processing a plurality of signal types of a set of signals, the set including CDMA signals, W-CDMA signals, and OFDM signals.

20. An interference cancellation system configurable to operate in a multi-mode receiver, comprising:
    a means for performing decomposition of a communication channel into a plurality of subchannels;
    a means for performing baseband processing, comprising a means for performing upstream baseband processing and a means for performing downstream baseband processing; and
    a means for canceling interference;
    wherein at least one of the means for performing decomposition, the means for performing baseband processing, and the means for canceling interference is configurable for processing multi-mode signals;
    a means for selecting subchannels that are likely to contribute interference to at least one signal of interest, for producing at least one selected interference symbol;
    a means for synthesizing a synthesized interference signal from the at least one selected interference symbol;
    a means for performing channel emulation to produce an estimated interference signal from the synthesized interference signal;
    a second means for performing upstream baseband processing to produce an estimated received interference signal from the estimated interference signal; and
    a means for orthogonally or obliquely projecting a signal output from the means for performing baseband processing onto an interference subspace of the estimated received interference signal.

21. The interference cancellation system recited in claim 20, wherein the means for synthesizing further comprises at least one means for compensating for multipath delay in a received baseband signal.

22. The interference cancellation system recited in claim 20, further comprising a means for producing a linear combination of synthesized interference signals.

23. The interference cancellation system recited in claim 20, wherein the means for orthogonally or obliquely projecting includes at least one of a means for performing orthogonal projection and a means for performing oblique projection.

24. The interference cancellation system recited in claim 20, wherein the means for selecting is configured to recursively determine subsets of channels that may be used in subtractions or in projections of increasing dimension.

25. The interference cancellation system recited in claim 20, wherein the means for synthesizing further comprises a means for imparting a delay to the at least one estimated interference signal in order to synchronize the at least one synthesized interference signal with a received baseband signal.

26. The interference cancellation system recited in claim 20, wherein the means for selecting includes a means for combining outputs from the means for canceling.

27. The interference cancellation system recited in claim 26, wherein the means for combining outputs is configured to combine the outputs over a plurality of subchannels and multi paths.

28. The interference cancellation system recited in claim 26, wherein means for combining outputs is configured to perform at least one of Maximal Ratio Combining, Equal Gain Combining, Minimum Mean Squared Error Combining, Minimum Variance Unbiased Combining, and Selection Combining.

29. The interference cancellation system recited in claim 20, wherein the multi-mode signals include at least one of a set of signals, including signals corresponding to multiple transmission protocols, signals corresponding to multiple variations of a particular transmission protocol, and signals corresponding to multiple receiver signal-processing techniques.

30. The interference cancellation system recited in claim 20, wherein the means for canceling interference is configured to process sequences of estimated symbols.

31. The interference cancellation system recited in claim 20 configured to operate in at least one of a transmit-diversity system and a receive-diversity system.

32. The interference cancellation system recited in claim 20, wherein the means for performing baseband processing comprises a means for performing Rake reception and a means for equalizing, the means for performing baseband processing being configured for selecting at least one of the means for performing Rake reception and the means for equalizing for processing a received baseband signal.

33. The interference cancellation system recited in claim 20, wherein at least one of the means for performing decomposition, the means for performing baseband processing, and the means for canceling interference is configurable for processing a plurality of signal types of a set of signals, the set including GSM signals, COMA signals, WCOMA signals, and OFOM signals.

34. The interference cancellation system recited in claim 20, wherein at least one of the means for performing decomposition, the means for performing baseband processing, and the means for canceling interference is configurable for processing a plurality of signal types of a set of signals, the set including CDMA signals, W-COMA signals, and OFOM signals.

35. A handset, comprising:
a channel decomposition module configured for performing a decomposition of a communication channel into a plurality of subchannels;
a baseband receiver comprising an upstream baseband processor and a downstream baseband processor; and
an interference canceller coupled between the upstream baseband processor and the downstream baseband processor;
wherein at least one of the channel decomposition module, the baseband receiver, and the interference cancellation system is configurable for processing multi-mode signals;
an interference selector coupled to the downstream baseband processor and configured for selecting subchannels that are likely to contribute interference to at least one signal of interest, for producing at least one selected interference symbol;
a synthesizer configured to synthesize a synthesized interference signal from the at least one selected interference symbol;
a channel emulator configured to produce an estimated interference signal from the synthesized interference signal;
a second upstream baseband processor coupled to the channel emulator and configured for producing an estimated received interference signal from the estimated interference signal; and
a canceller configured for orthogonally or obliquely projecting a signal output from the baseband receiver onto a subspace that is orthogonal or oblique to a subspace of the estimated received interference signal.

36. The handset recited in claim 35, wherein the synthesizer is configured for producing a linear combination of synthesized interference signals.

37. The handset recited in claim 35, wherein the interference selector is configured to recursively determine subsets of channels that may be used in subtractions or in projections of increasing dimension.

38. The handset recited in claim 35, wherein the baseband receiver further comprises a combiner configured for combining a plurality of signal outputs from the baseband receiver.

39. The handset recited in claim 35, wherein the interference canceller comprises a subtractive canceller.

40. The handset recited in claim 35, wherein the channel decomposition module includes a physical channel identification module configured to estimate a multipath profile.

41. The handset recited in claim 35, wherein the multi-mode signals include at least one of a set of signals, including signals corresponding to multiple transmission protocols, signals corresponding to multiple variations of a particular transmission protocol, and signals corresponding to multiple receiver signal-processing techniques.

42. The handset recited in claim 35, wherein the interference canceller is configured to process a sequence of estimated symbols.

43. The handset recited in claim 35, wherein at least one of the synthesizer, the channel emulator, and the second upstream baseband processor is configured to synchronize the estimated received interference signal with the signal output from the baseband receiver.

44. The handset recited in claim 35, wherein the channel decomposition module is configured to track signals that are identified as at least one of strong sources and strong multi path components.

45. The handset recited in claim 35, wherein the baseband receiver comprises a Rake receiver and an equalizer, the baseband receiver being configured for selecting at least one of the Rake receiver and the equalizer for processing a received baseband signal.

46. The handset recited in claim 35, configured to operate in at least one of a transmit diversity system and a receive-diversity system.

47. The handset recited in claim 35, wherein the interference canceller includes an interference-cancelled signal combiner.

48. The handset recited in claim 47, wherein the interference-cancelled signal combiner is configured to combine the outputs over a plurality of subchannels and multi paths.

49. The handset recited in claim 47, wherein the interference-cancelled signal combiner is configured to perform at least one of Maximal Ratio Combining, Equal Gain Combining, Minimum Mean Squared Error Combining, Minimum Variance Unbiased Combining, and Selection Combining.

50. The handset recited in claim 35, wherein at least one of the channel decomposition module, the baseband receiver, and the interference cancellation system is configurable for processing a plurality of signal types of a set of signals, the set including GSM signals, CDMA signals, W-CDMA signals, and OFDM signals.

51. The handset recited in claim 35, wherein at least one of the channel decomposition module, the baseband receiver, and the interference cancellation system is configurable for processing a plurality of signal types of a set of signals, the set including CDMA signals, W-CDMA signals, and OFDM signals.

52. A chipset, comprising:
- a channel decomposition module configured for performing a decomposition of a communication channel into a plurality of subchannels;
- a baseband receiver comprising an upstream baseband processor and a downstream baseband processor; and
- an interference canceller coupled between the upstream baseband processor and the downstream baseband processor;
- wherein at least one of the channel decomposition module, the baseband receiver, and the interference cancellation system is configurable for processing multi-mode signals;
- an interference selector coupled to the downstream baseband processor and configured for selecting subchannels that are likely to contribute interference to at least one signal of interest, for producing at least one selected interference symbol;
- a synthesizer configured to synthesize a synthesized interference signal from the at least one selected interference symbol;
- a channel emulator configured to produce an estimated interference signal from the synthesized interference signal;
- a second upstream baseband processor coupled to the channel emulator and configured for producing an estimated received interference signal from the estimated interference signal; and
- a canceller configured for orthogonally or obliquely projecting a signal output from the baseband receiver onto a subspace that is orthogonal or oblique to a subspace of the estimated received interference signal.

53. The chipset recited in claim 52, wherein the synthesizer is configured for producing a linear combination of synthesized interference signals.

54. The chipset recited in claim 52, wherein the interference selector is configured to recursively determine subsets of channels that may be used in subtractions or in projections of increasing dimension.

55. The chipset recited in claim 52, wherein the baseband receiver further comprises a combiner configured for combining a plurality of signal outputs from the baseband receiver.

56. The chipset recited in claim 52, wherein the interference canceller comprises a subtractive canceller.

57. The chipset recited in claim 52, wherein the channel decomposition module includes a physical channel identification module configured to estimate a multipath profile.

58. The chipset recited in claim 52, wherein the multi-mode signals include at least one of a set of signals, including signals corresponding to multiple transmission protocols, signals corresponding to multiple variations of a particular transmission protocol, and signals corresponding to multiple receiver signal-processing techniques.

59. The chipset recited in claim 52, wherein the interference canceller is configured to process a sequence of estimated symbols.

60. The chipset recited in claim 52, wherein at least one of the synthesizer, the channel emulator, and the second upstream baseband processor is configured to synchronize the estimated received interference signal with the signal output from the baseband receiver.

61. The chipset recited in claim 52, wherein the channel decomposition module is configured to track signals that are identified as at least one of strong sources and strong multipath components.

62. The chipset recited in claim 52, wherein the baseband receiver comprises a Rake receiver and an equalizer, the baseband receiver being configured for selecting at least one of the Rake receiver and the equalizer for processing a received baseband signal.

63. The chipset recited in claim 52 configured to operate in at least one of a transmit-diversity system and a receive-diversity system.

64. The chipset recited in claim 52, wherein the interference canceller includes an interference-cancelled signal combiner.

65. The chipset recited in claim 64, wherein the interference-cancelled signal combiner is configured to combine the outputs over a plurality of subchannels and multipaths.

66. The chipset recited in claim 64, wherein the interference-cancelled signal combiner is configured to perform at least one of Maximal Ratio Combining, Equal Gain Combining, Minimum Mean Squared Error Combining, Minimum Variance Unbiased Combining, and Selection Combining.

67. The chipset recited in claim 52, wherein at least one of the channel decomposition module, the baseband receiver, and the interference cancellation system is configurable for processing a plurality of signal types of a set of signals, the set including GSM signals, CDMA signals, W-CDMA signals, and OFDM signals.

68. The chipset recited in claim 52, wherein at least one of the channel decomposition module, the baseband receiver, and the interference cancellation system is configurable for processing a plurality of signal types of a set of signals, the set including CDMA signals, W-CDMA signals, and OFDM signals.

* * * * *